(12) United States Patent
Patwari et al.

(10) Patent No.: US 12,147,379 B2
(45) Date of Patent: Nov. 19, 2024

(54) SCALABLE ACCELERATION OF REENTRANT COMPUTE OPERATIONS

(71) Applicant: XILINX, INC., San Jose, CA (US)

(72) Inventors: Rajeev Patwari, San Jose, CA (US); Jorn Tuyls, Dublin (IE); Elliott Delaye, San Jose, CA (US); Xiao Teng, Cupertino, CA (US); Ephrem Wu, San Mateo, CA (US)

(73) Assignee: XILINX, INC., San Jose, CA (US)

( * ) Notice: Subject to any disclaimer, the term of this patent is extended or adjusted under 35 U.S.C. 154(b) by 44 days.

(21) Appl. No.: 18/089,780

(22) Filed: Dec. 28, 2022

(65) Prior Publication Data
US 2024/0220444 A1     Jul. 4, 2024

(51) Int. Cl.
*G06F 15/78*     (2006.01)
*G06F 13/28*     (2006.01)

(52) U.S. Cl.
CPC ............ *G06F 15/786* (2013.01); *G06F 13/28* (2013.01)

(58) Field of Classification Search
CPC ............................... G06F 13/28; G06F 15/786
See application file for complete search history.

(56) References Cited

U.S. PATENT DOCUMENTS

| | | | |
|---|---|---|---|
| 10,572,386 B1* | 2/2020 | Gokhale | G06F 3/064 |
| 2012/0089812 A1* | 4/2012 | Smith | G06F 9/4843 |
| | | | 712/21 |
| 2022/0164297 A1* | 5/2022 | Sity | G06F 12/0802 |
| 2022/0198117 A1* | 6/2022 | Raumann | G06F 9/5011 |

OTHER PUBLICATIONS

Ba, J.L., et al., "Layer Normalization," arXiv:1607.06450v1, Jul. 21, 2016, 14 pgs.
Vaswani, A., et al., "Attention Is All You Need," arXiv:1706.03762v5, Dec. 6, 2017, 15 pgs.
Pytorch, "LAYERNORM, " 2022, https://pytorch.org/docs/stable/generated/torch.nn.LayerNorm.html.
Ioffe, S., et al., "Batch Normalization: Accelerating Deep Network Training by Reducing Internal Covariate Shift," arXiv:1502.03167v3, Mar. 2, 2015, 11 pgs.

* cited by examiner

*Primary Examiner* — Zachary K Huson
(74) *Attorney, Agent, or Firm* — Patterson + Sheridan, LLP (57) ABSTRACT

Examples herein describe techniques for performing parallel processing using a plurality of processing elements (PEs) and a controller for data that has data dependencies. For example, a calculation may require an entire row or column to be summed, or to determine its mean. The PEs can be assigned different chunks of a data set (e.g., a tensor set, a column, or a row) for processing. The PEs can use one or more tokens to inform the controller when they are done with partial processing of their data chunks. The controller can then gather the partial results and determine an intermediate value for the data set. The controller can then distribute this intermediate value to the PEs which then re-process their respective data chunks using the intermediate value to generate final results.

20 Claims, 8 Drawing Sheets

SCALABLE ACCELERATION OF REENTRANT COMPUTE OPERATIONS

TECHNICAL FIELD

Examples of the present disclosure generally relate to parallel computing for reentrant computer operations with data dependency.

BACKGROUND

Deep learning (DL) is a branch of machine learning that uses various layers to categorize the input data into categories of interest. Natural Language Processing (NLP) is one of the areas where DL is evolving rapidly. Transformer networks and Bidirectional Encoder Representations from Transformers (BERT) are state-of-the-art Neural Network architectures for NLP tasks. Like Convolutional Neural Networks (CNNs). NLP networks can be cascaded and often include several linear and non-linear functions. A "linear" layer computes either multiplication or correlation of input data with model dependent parameters and subsequently adds a "bias" to the multiplied output. A "non-linear" layer enables the network to learn many complex non-linear features pertaining to the specific layer, enabling complex feature detection in subsequent layers. This enables learning of parameters during training and perform prediction with better accuracy during inference.

Core block of Transformers and BERT is an "Attention" module. The Attention module generally includes a linear matrix multiplication, followed by non-linear GeLU/Soft-Max/Erf functions, depending on the architecture of the transformer network. This attention module appears several times in the network, often cascaded. In many network architectures, non-linear function in the attention can be different than non-linear functions outside the attention module. The importance of the Attention module is to recognize temporal and/or spatial dependencies in input data (often a sequence of words or symbols). Given the prevalence of the attention module, it is important to develop a method that can provide a highly efficient, reconfigurable, yet accurate method to perform Softmax and Layer Norm (or normalization) layers to improve inference throughput on the hardware devices executing the machine learning application.

SUMMARY

One example is an integrated circuit (IC) that includes a plurality of processing elements (PEs) comprising circuitry, each of the plurality of PEs comprising a local memory for storing data chunks of a data set where the plurality of PEs is configured to perform an operation that has a data dependency among the data chunk, and a controller comprising circuitry configured to receive at least one token from the plurality of PEs indicating they have finished a first iteration of processing the data chunks in parallel, receive partial results generated by the plurality of PEs based on performing the first iteration, determine intermediate results from the partial results to resolve the data dependency, and distribute the intermediate results to the plurality of PEs. Moreover, the plurality of PEs is configured to perform a second iteration to process the data chunks in parallel based on the intermediate results.

One example described herein is an IC that includes a plurality of PEs comprising circuitry, each of the plurality of PEs comprising a local memory for storing a respective data chunk of a data set where the plurality of PEs is configured to perform an algorithm on the data chunks that includes an operation which requires each of the data chunks, and a controller comprising circuitry configured to receive at least one token from the plurality of PEs indicating they have finished a first iteration of processing the data chunks in parallel, receive partial results generated by the plurality of PEs based on performing the first iteration, determine intermediate results from the partial results to resolve the data dependency, and distribute the intermediate results to the plurality of PEs. Moreover, the plurality of PEs is configured to perform a second iteration to process the data chunks in parallel based on the intermediate results One example described herein is a method that includes processing, during a first iteration and in parallel, data chunks of a data set at respective ones of a plurality of PE where the first iteration is part of an operation that has a data dependency among the data chunks, transmitting, from at least PE of the plurality of PE, a token to a controller indicating the plurality of PEs have finished the first iteration, receiving, at the controller, partial results generated by the plurality of PEs based on performing the first iteration, determining intermediate results from the partial results to resolve the data dependency, distributing the intermediate results to the plurality of PEs, and processing, during a second iteration and in parallel, the data chunks and the intermediate results at the plurality of PEs.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe techniques for performing parallel processing using a plurality of processing elements (PEs) and a controller for data that has data dependencies—e.g., data dependencies on a tensor set for Softmax and Layer Norm (or normalization) layers. For example, a calculation may require an entire row or column to be summed, or to determine its mean. If this data is sent to multiple different PEs, then each PE is dependent on the calculations made by the other PEs, thereby removing the advantage of distributing the data to different PEs. In this case, parallel processing becomes less advantageous, or even disadvantageous, since the data has to be routed to the same PE.

To enable efficient parallel processing on data with data dependencies, the embodiments herein provide a hardware system (e.g., an integrated circuit) that includes a plurality of PEs which are coupled to a controller. The controller can be another PE or a separate processor (e.g., a microprocessor). The PEs can be assigned different chunks of a data set (e.g., a tensor set, a column, or a row) for processing. The PEs can use tokens to inform the controller when they are done with partial processing of their data chunks. The controller can then gather the partial results and calculate an intermediate value for the data set. The controller can then distribute this intermediate value (e.g., an inverse square root) to the PEs which can then use this value to re-process their respective data chunks (e.g., perform a reentrant compute operation) to generate final results. In this manner, the hardware system gains the advantages of parallel processing while resolving the data dependency between the different data chunks.

Figure 1:
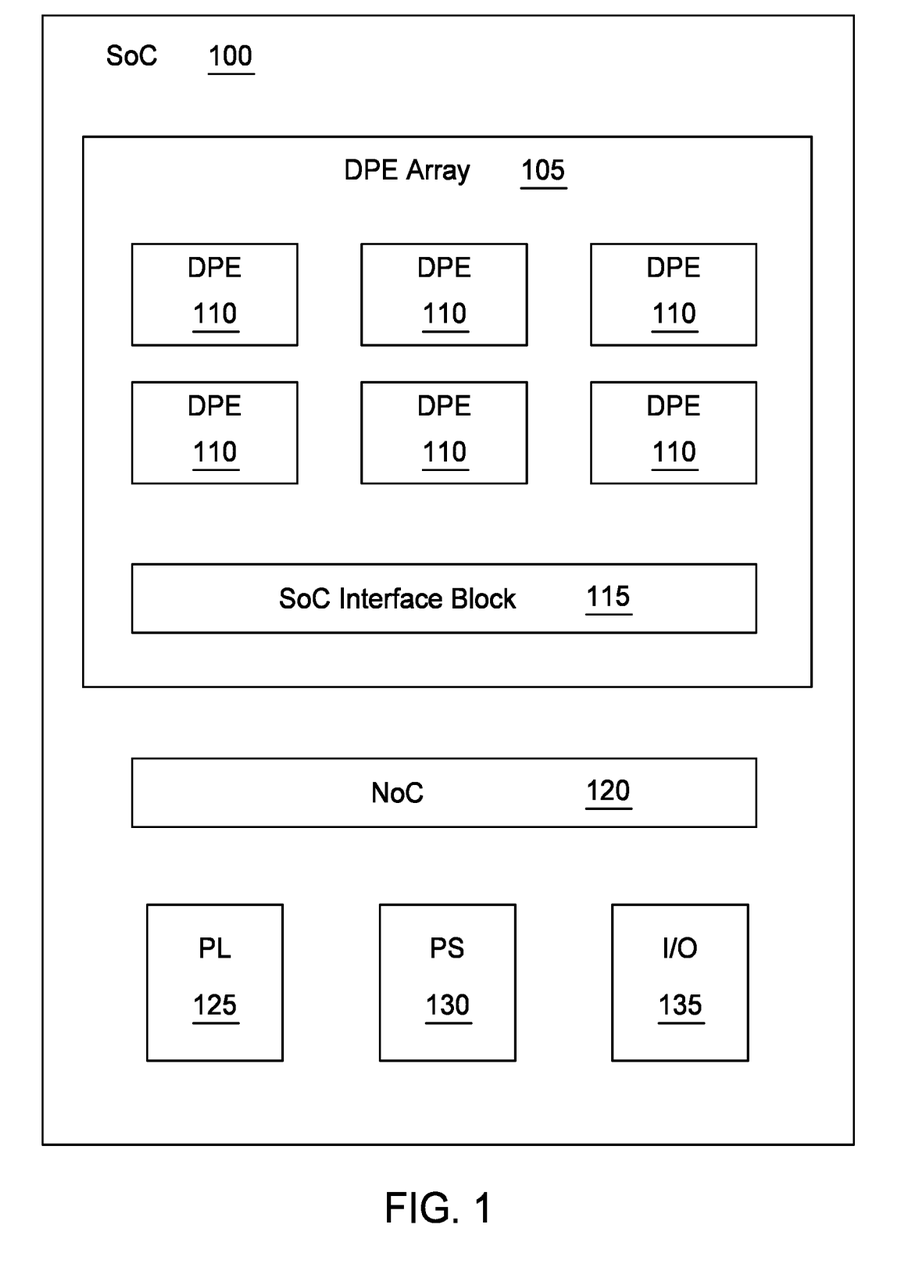
FIG. 1 is a block diagram of a SoC that includes a data processing engine array, according to an example.

FIG. 1 is a block diagram of a SoC 100 that includes a data processing engine (DPE) array 105, according to an example. The DPE array 105 includes a plurality of DPEs 110 which may be arranged in a grid, cluster, or checkerboard pattern in the SoC 100. Although FIG. 1 illustrates arranging the DPEs 110 in a 2D array with rows and columns, the embodiments are not limited to this arrangement. Further, the array 105 can be any size and have any number of rows and columns formed by the DPEs 110.

In one embodiment, the DPEs 110 are identical. That is, each of the DPEs 110 (also referred to as tiles or blocks) may have the same hardware components or circuitry. Further, the embodiments herein are not limited to DPEs 110. Instead, the SoC 100 can include an array of any kind of processing elements, for example, the DPEs 110 could be digital signal processing engines, cryptographic engines, Forward Error Correction (FEC) engines, Artificial Intelligence (AI) engines or other specialized hardware for performing one or more specialized tasks.

In FIG. 1, the array 105 includes DPEs 110 that are all the same type (e.g., a homogeneous array). However, in another embodiment, the array 105 may include different types of engines. For example, the array 105 may include digital signal processing engines, cryptographic engines, graphic processing engines, and the like. Regardless if the array 105 is homogenous or heterogeneous, the DPEs 110 can include direct connections between DPEs 110 which permit the DPEs 110 to transfer data directly as described in more detail below.

In one embodiment, the DPEs 110 are formed from software-configurable hardened logic—i.e., are hardened. One advantage of doing so is that the DPEs 110 may take up less space in the SoC 100 relative to using programmable logic to form the hardware elements in the DPEs 110. That is, using hardened logic circuitry to form the hardware elements in the DPE 110 such as program memories, an instruction fetch/decode unit, fixed-point vector units, floating-point vector units, arithmetic logic units (ALUs), multiply accumulators (MAC), and the like can significantly reduce the footprint of the array 105 in the SoC 100. Although the DPEs 110 may be hardened, this does not mean the DPEs 110 are not programmable. That is, the DPEs 110 can be configured when the SoC 100 is powered on or rebooted to perform different functions or tasks.

The DPE array 105 also includes a SoC interface block 115 (also referred to as a shim) that serves as a communication interface between the DPEs 110 and other hardware components in the SoC 100. In this example, the SoC 100 includes a network on chip (NoC) 120 that is communicatively coupled to the SoC interface block 115. Although not shown, the NoC 120 may extend throughout the SoC 100 to permit the various components in the SoC 100 to communicate with each other. For example, in one physical implementation, the DPE array 105 may be disposed in an upper right portion of the integrated circuit forming the SoC 100. However, using the NoC 120, the array 105 can nonetheless communicate with, for example, programmable logic (PL) 125, a processor subsystem (PS) 130 or input/output (I/O) 135 which may be disposed at different locations throughout the SoC 100.

In addition to providing an interface between the DPEs 110 and the NoC 120, the SoC interface block 115 may also provide a connection directly to a communication fabric in the PL 125. In this example, the PL 125 and the DPEs 110 form a heterogeneous processing system since some of the kernels in a dataflow graph may be assigned to the DPEs 110 for execution while others are assigned to the PL 125. While FIG. 1 illustrates a heterogeneous processing system in a SoC, in other examples, the heterogeneous processing system can include multiple devices or chips. For example, the heterogeneous processing system could include two FPGAs or other specialized accelerator chips that are either the same type or different types. Further, the heterogeneous processing system could include two communicatively coupled SoCs.

Figure 2:
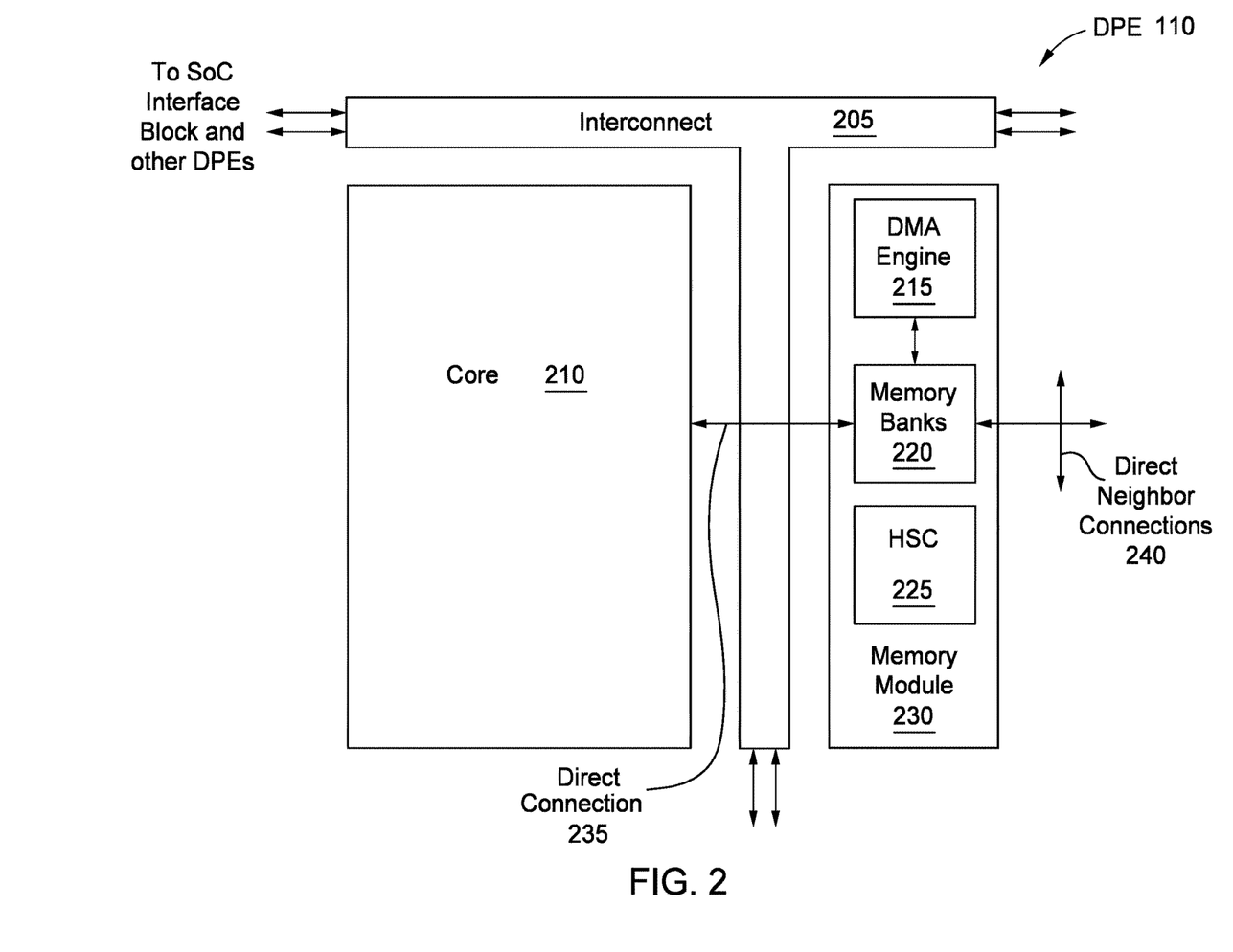
FIG. 2 is a block diagram of a data processing engine in the data processing engine array, according to an example.

This can be difficult for a programmer to manage since communicating between kernels disposed in heterogeneous or different processing cores can include using the various communication interfaces shown in FIG. 1 such as the NoC 120, the SoC interface block 115, as well as the communication links between the DPEs 110 in the array 105 (which are shown in FIG. 2).

In one embodiment, the SoC interface block 115 includes separate hardware components for communicatively coupling the DPEs 110 to the NoC 120 and to the PL 125 that is disposed near the array 105 in the SoC 100. In one embodiment, the SoC interface block 115 can stream data directly to a fabric for the PL 125. For example, the PL 125 may include an FPGA fabric which the SoC interface block 115 can stream data into, and receive data from, without using the NoC 120. That is, the circuit switching and packet switching described herein can be used to communicatively couple the DPEs 110 to the SoC interface block 115 and also to the other hardware blocks in the SoC 100. In another example, SoC interface block 115 may be implemented in a different die than the DPEs 110. In yet another example, DPE array 105 and at least one subsystem may be implemented in a same die while other subsystems and/or other DPE arrays are implemented in other dies. Moreover, the streaming interconnect and routing described herein with respect to the DPEs 110 in the DPE array 105 can also apply to data routed through the SoC interface block 115.

Although FIG. 1 illustrates one block of PL 125, the SoC 100 may include multiple blocks of PL 125 (also referred to as configuration logic blocks) that can be disposed at different locations in the SoC 100. For example, the SoC 100 may include hardware elements that form a field programmable gate array (FPGA). However, in other embodiments, the SoC 100 may not include any PL 125—e.g., the SoC 100 is an application specific integrated circuit (ASIC).

FIG. 2 is a block diagram of a DPE 110 in the DPE array 105 illustrated in FIG. 1, according to an example. The DPE 110 includes an interconnect 205, a core 210, and a memory module 230. The interconnect 205 permits data to be transferred from the core 210 and the memory module 230 to different cores in the array 105. That is, the interconnect 205 in each of the DPEs 110 may be connected to each other so that data can be transferred north and south (e.g., up and down) as well as east and west (e.g., right and left) in the array of DPEs 110.

Referring back to FIG. 1, in one embodiment, the DPEs 110 in the upper row of the array 105 relies on the interconnects 205 in the DPEs 110 in the lower row to communicate with the SoC interface block 115. For example, to transmit data to the SoC interface block 115, a core 210 in a DPE 110 in the upper row transmits data to its interconnect 205 which is in turn communicatively coupled to the interconnect 205 in the DPE 110 in the lower row. The interconnect 205 in the lower row is connected to the SoC interface block 115. The process may be reversed where data intended for a DPE 110 in the upper row is first transmitted from the SoC interface block 115 to the interconnect 205 in the lower row and then to the interconnect 205 in the upper row that is the target DPE 110. In this manner, DPEs 110 in the upper rows may rely on the interconnects 205 in the DPEs 110 in the lower rows to transmit data to and receive data from the SoC interface block 115.

In one embodiment, the interconnect 205 includes a configurable switching network that permits the user to determine how data is routed through the interconnect 205. In one embodiment, unlike in a packet routing network, the interconnect 205 may form streaming point-to-point connections. That is, the streaming connections and streaming interconnects (not shown in FIG. 2) in the interconnect 205 may form routes from the core 210 and the memory module 230 to the neighboring DPEs 110 or the SoC interface block 115. Once configured, the core 210 and the memory module 230 can transmit and receive streaming data along those routes. In one embodiment, the interconnect 205 is configured using the Advanced Extensible Interface (AXI) 4 Streaming protocol.

In addition to forming a streaming network, the interconnect 205 may include a separate network for programming or configuring the hardware elements in the DPE 110. Although not shown, the interconnect 205 may include a memory mapped interconnect which includes different connections and switch elements used to set values of configuration registers in the DPE 110 that alter or set functions of the streaming network, the core 210, and the memory module 230.

In one embodiment, streaming interconnects (or network) in the interconnect 205 support two different modes of operation referred to herein as circuit switching and packet switching. In one embodiment, both of these modes are part of, or compatible with, the same streaming protocol—e.g., an AXI Streaming protocol. Circuit switching relies on reserved point-to-point communication paths between a source DPE 110 to one or more destination DPEs 110. In one embodiment, the point-to-point communication path used when performing circuit switching in the interconnect 205 is not shared with other streams (regardless whether those streams are circuit switched or packet switched). However, when transmitting streaming data between two or more DPEs 110 using packet-switching, the same physical wires can be shared with other logical streams.

The core 210 may include hardware elements for processing digital signals. For example, the core 210 may be used to process signals related to wireless communication, radar, vector operations, machine learning applications (e.g., AI applications), and the like. As such, the core 210 may include program memories, an instruction fetch/decode unit, fixed-point vector units, floating-point vector units, arithmetic logic units (ALUs), multiply accumulators (MAC), and the like. However, as mentioned above, this disclosure is not limited to DPEs 110. The hardware elements in the core 210 may change depending on the engine type. That is, the cores in a digital signal processing engine, cryptographic engine, or FEC may be different.

The memory module 230 includes a DMA engine 215, memory banks 220, and hardware synchronization circuitry (HSC) 225 or other type of hardware synchronization block. In one embodiment, the DMA engine 215 enables data to be received by, and transmitted to, the interconnect 205. That is, the DMA engine 215 may be used to perform DMA reads and write to the memory banks 220 using data received via the interconnect 205 from the SoC interface block or other DPEs 110 in the array.

The memory banks 220 can include any number of physical memory elements (e.g., SRAM). For example, the memory module 230 may be include 4, 8, 16, 32, etc. different memory banks 220. In this embodiment, the core 210 has a direct connection 235 to the memory banks 220. Stated differently, the core 210 can write data to, or read data from, the memory banks 220 without using the interconnect 205. That is, the direct connection 235 may be separate from the interconnect 205. In one embodiment, one or more wires in the direct connection 235 communicatively couple the core 210 to a memory interface in the memory module 230 which is in turn coupled to the memory banks 220.

In one embodiment, the memory module 230 also has direct connections 240 to cores in neighboring DPEs 110. Put differently, a neighboring DPE in the array can read data from, or write data into, the memory banks 220 using the direct neighbor connections 240 without relying on their interconnects or the interconnect 205 shown in FIG. 2. The HSC 225 can be used to govern or protect access to the memory banks 220. In one embodiment, before the core 210 or a core in a neighboring DPE can read data from, or write data into, the memory banks 220, the core (or the DMA engine 215) requests a lock acquire to the HSC 225 when it wants to read or write to the memory banks 220 (i.e., when the core/DMA engine want to "own" a buffer, which is an assigned portion of the memory banks 220. If the core or DMA engine does not acquire the lock, the HSC 225 will stall (e.g., stop) the core or DMA engine from accessing the memory banks 220. When the core or DMA engine is done with the buffer, they release the lock to the HSC 225. In one embodiment, the HSC 225 synchronizes the DMA engine 215 and core 210 in the same DPE 110 (i.e., memory banks 220 in one DPE 110 are shared between the DMA engine 215 and the core 210). Once the write is complete, the core (or the DMA engine 215) can release the lock which permits cores in neighboring DPEs to read the data.

Because the core 210 and the cores in neighboring DPEs 110 can directly access the memory module 230, the memory banks 220 can be considered as shared memory between the DPEs 110. That is, the neighboring DPEs can directly access the memory banks 220 in a similar way as the core 210 that is in the same DPE 110 as the memory banks 220. Thus, if the core 210 wants to transmit data to a core in a neighboring DPE, the core 210 can write the data into the memory bank 220. The neighboring DPE can then retrieve the data from the memory bank 220 and begin processing the data. In this manner, the cores in neighboring DPEs 110 can transfer data using the HSC 225 while avoiding the extra latency introduced when using the interconnects 205. In contrast, if the core 210 wants to transfer data to a non-neighboring DPE in the array (i.e., a DPE without a direct connection 240 to the memory module 230), the core 210 uses the interconnects 205 to route the data to the memory module of the target DPE which may take longer to complete because of the added latency of using the interconnect 205 and because the data is copied into the memory module of the target DPE rather than being read from a shared memory module.

In addition to sharing the memory modules 230, the core 210 can have a direct connection to cores 210 in neighboring DPEs 110 using a core-to-core communication link (not shown). That is, instead of using either a shared memory module 230 or the interconnect 205, the core 210 can transmit data to another core in the array directly without storing the data in a memory module 230 or using the interconnect 205 (which can have buffers or other queues). For example, communicating using the core-to-core communication links may use less latency (or have high bandwidth) than transmitting data using the interconnect 205 or shared memory (which requires a core to write the data and then another core to read the data) which can offer more cost effective communication. In one embodiment, the core-to-core communication links can transmit data between two cores 210 in one clock cycle. In one embodiment, the data is transmitted between the cores on the link without being stored in any memory elements external to the cores 210. In one embodiment, the core 210 can transmit a data word or vector to a neighboring core using the links every clock cycle, but this is not a requirement.

In one embodiment, the communication links are streaming data links which permit the core 210 to stream data to a neighboring core. Further, the core 210 can include any number of communication links which can extend to different cores in the array. In this example, the DPE 110 has respective core-to-core communication links to cores located in DPEs in the array that are to the right and left (east and west) and up and down (north or south) of the core 210. However, in other embodiments, the core 210 in the DPE 110 illustrated in FIG. 2 may also have core-to-core communication links to cores disposed at a diagonal from the core 210. Further, if the core 210 is disposed at a bottom periphery or edge of the array, the core may have core-to-core communication links to only the cores to the left, right, and bottom of the core 210.

However, using shared memory in the memory module 230 or the core-to-core communication links may be available if the destination of the data generated by the core 210 is a neighboring core or DPE. For example, if the data is destined for a non-neighboring DPE (i.e., any DPE that DPE 110 does not have a direct neighboring connection 240 or a core-to-core communication link), the core 210 uses the interconnects 205 in the DPEs to route the data to the appropriate destination. As mentioned above, the interconnects 205 in the DPEs 110 may be configured when the SoC is being booted up to establish point-to-point streaming connections to non-neighboring DPEs to which the core 210 will transmit data during operation.

Figure 3:
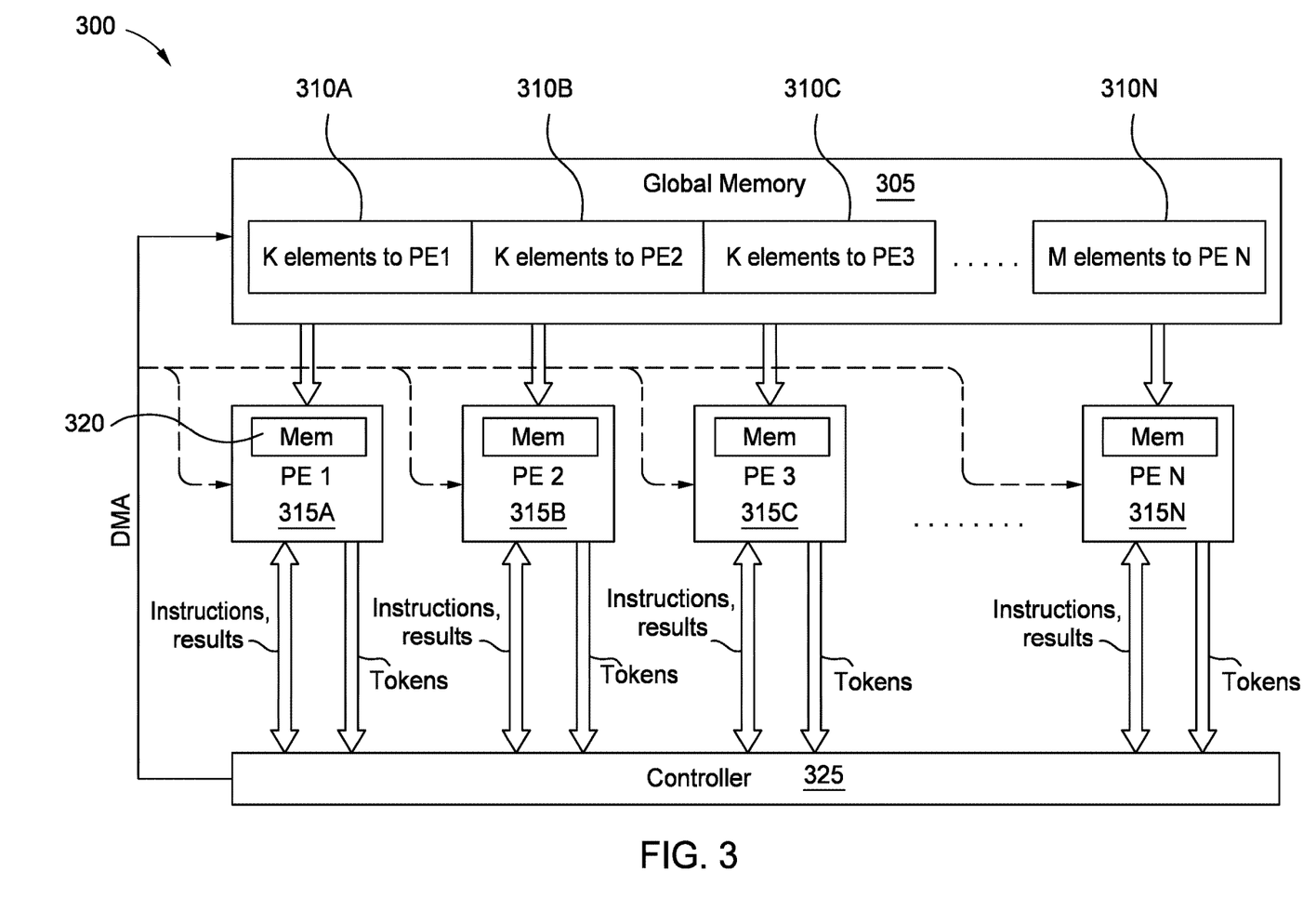
FIG. 3 illustrates a hardware system for parallel processing with data dependencies, according to an example.

FIG. 3 illustrates a hardware system 300 for parallel processing with data dependencies, according to an example. The system 300 includes a global memory 305 that stores data elements 310 (e.g., data chunks) assigned for processing to a plurality of PEs 315. In one embodiment, the data elements 310 are part of a related data set (e.g., data in the same tensor, a same column, a same row, etc.). Moreover, the process (or algorithm) performed by the PEs 315 on the data elements 310 may have a data dependency such as having to sum across the data elements 310 or a calculate the mean of the data elements 310. That is, the PEs 315 may be assigned to perform an algorithm that includes an operation which uses each of the data elements in the data set. However, because the PEs 315 only receive a portion of the data set (e.g., a respective data element 310), they cannot resolve this data dependency.

The hardware system 300 includes a controller 325 for calculating an intermediate result that resolves the data dependency. As shown, the PEs 315 receive the data elements 310 from a global memory 305 which are stored in local memories 320. The PEs 315 then perform initial processing on the data elements 310 during a first iteration. When done, the PEs 315 send tokens to the controller 325 indicating they have completed first iteration and generated partial results.

After receiving tokens from each of the PEs 315, the controller 325 requests the partial results from the PEs 315. Once it retrieves the partial results from the PEs 315, the controller 325 can perform an operation that requires the use of the entire data set (e.g., a sum, mean, or other operation of the data set that includes the data elements 310A-310N). Once calculated, the controller 325 then transmits an intermediate value to each of the PEs 315 which they can then use to re-process the data elements 310, which are still stored in their local memories 320. This process is discussed in more detail in FIG. 4.

In one embodiment, the hardware system 300 can be implemented using the SoC 100 in FIG. 1. For example, the DPEs 110 (or the cores in the DPEs 110) can be assigned to the PEs 315. For instance, multiple DPEs 110 may be assigned to a PE 315. Stated different, a PE 315 can be formed from one or more of the DPEs 110.

In one embodiment, the controller 325 can also be implemented using one of the DPEs 110 (or a core in a DPE 110). In another embodiment, the controller 325 can be implemented using a microprocessor that is part of the PS 130. For example, the PS 130 may include a specialized processor for implementing the controller 325. In another embodiment, the controller may be a specialized processor that is implemented in the PL 125 in the SoC 100. Thus, the controller 325 can be implemented in the same DPE array as the PEs or can be implemented using a processor element external to the DPE array but in the same SoC 100 or integrated circuit (IC).

In one embodiment, the same piece of hardware or circuitry that receives the partial results from the PEs may not directly determine the intermediate results (e.g., a scale factor). For example, one piece of circuitry (e.g., a microprocessor) may collect the partial results from the PEs but then instructs another piece of circuitry (e.g., another PE) to actually calculate the intermediate result. In this case, both pieces of circuitry or hardware may be considered as part of the same controller 325.

The SoC 100 is just one suitable hardware platform for implementing the hardware system 300. The embodiments herein can be implemented using any suitable IC with processing cores and memory for implementing the PEs 315 and the controller 325.

Figure 4:
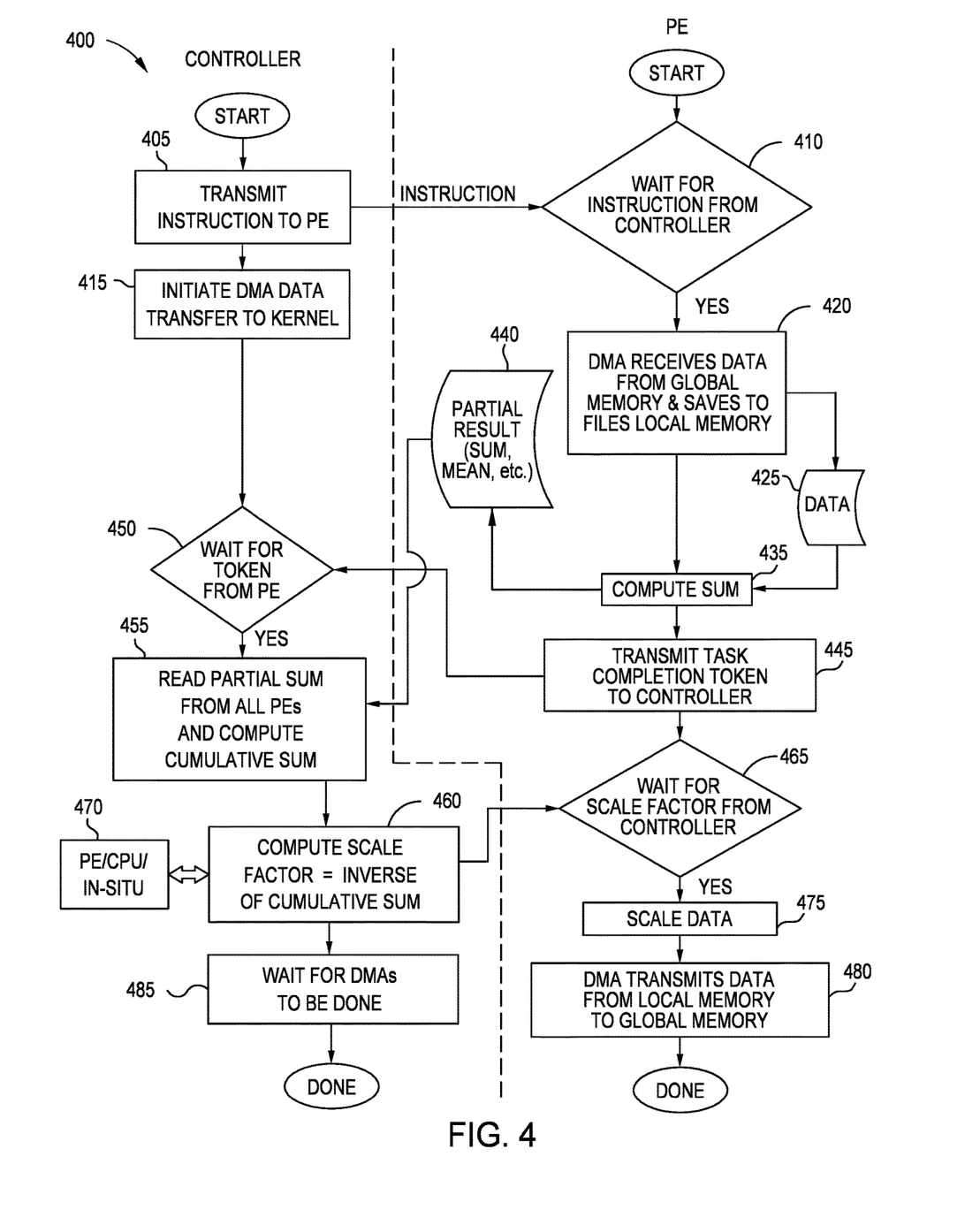
FIG. 4 illustrates a workflow with a processing element and a controller, according to an example.

FIG. 4 illustrates a workflow 400 with a PE and a controller, according to an example. The workflow 400 can be used to perform parallel processing using the PEs 315 and the controller 325 discussed in FIG. 3. While the workflow 400 is between one PE and the controller, the workflow 400 can be used between multiple PEs and the same controller.

At block 405, the controller transmits an instruction to the PE to process a data element (e.g., one of the data elements 310 in FIG. 3).

At block 410, the PE waits until receiving the instruction from the PE.

At block 415, the controller initiates a data transfer (e.g., using a direct memory access (DMA) transfer or any other suitable data transfer method) to transfer the data corresponding to the instructions to the PE. In one embodiment, the controller instructs the global memory to transfer respective data elements to the PEs.

At block 420, the PE receives the data element, via DMA, from the global memory and stores the data element in its local memory.

At block 425, the PE processes the data (e.g., performs a first iteration). At block 435, the PE computes an partial result (e.g., a sum, multiplication, etc.) from processing the assigned data element.

At block 445, the PE saves the partial result in its local memory, and at block 450 the PE transmits a task completion token to the controller, indicating the partial result has been determined.

At block 450, the controller waits for the token from the PE. In one embodiment, the controller can perform other tasks while waiting for the token. That is, the token can operate as an interrupt to the controller so that the controller can perform other tasks while waiting for the PE to compute the partial results.

At block 455, the controller reads partial results (e.g., partial sums) from the remaining PEs and computes a cumulative sum (or some other operation) on the partial sums received from the PEs assigned the data elements in the data set. In general, the controller can perform any operation using the partial results such as a multiplication, average, mean, square root, etc.

At block 460, the controller computes a scale factor using the cumulative sum. In this example, the controller computes the inverse of the cumulative sum, but this is just one example of intermediate results that can calculated from the partial results received from the PEs. In general, the controller can perform any operation to generate an intermediate result or intermediate value for the PEs such as the scale factor. The controller then distributes (e.g., broadcasts) the scale factor to the PEs.

At block 470, the controller performs a computation before returning the result to the PEs, such as 1/x, 1/sqrt(x), where x is for example the cumulative sum computed from the partial sums.

At block 465, the PE waits for the scale factor from the controller. Once received, at block 475, the PE scales the data using the scale factor. For example, the scale factor can be used to re-process the data elements saved in the local memory of the PEs. Thus, determining the scale factor using the partial results from the PEs and then distributing the scale factor to the PE for further process in an example of a reentrant compute operation.

At block 480, the PE transmits the final results to the global memory.

At block 485, the controller waits for the DMAs from the PEs to the global controller to finish. Once done, the workflow 400 can repeat where the controller can transmit other instructions to the PEs to perform parallel processing on a different data set.

Figure 5:
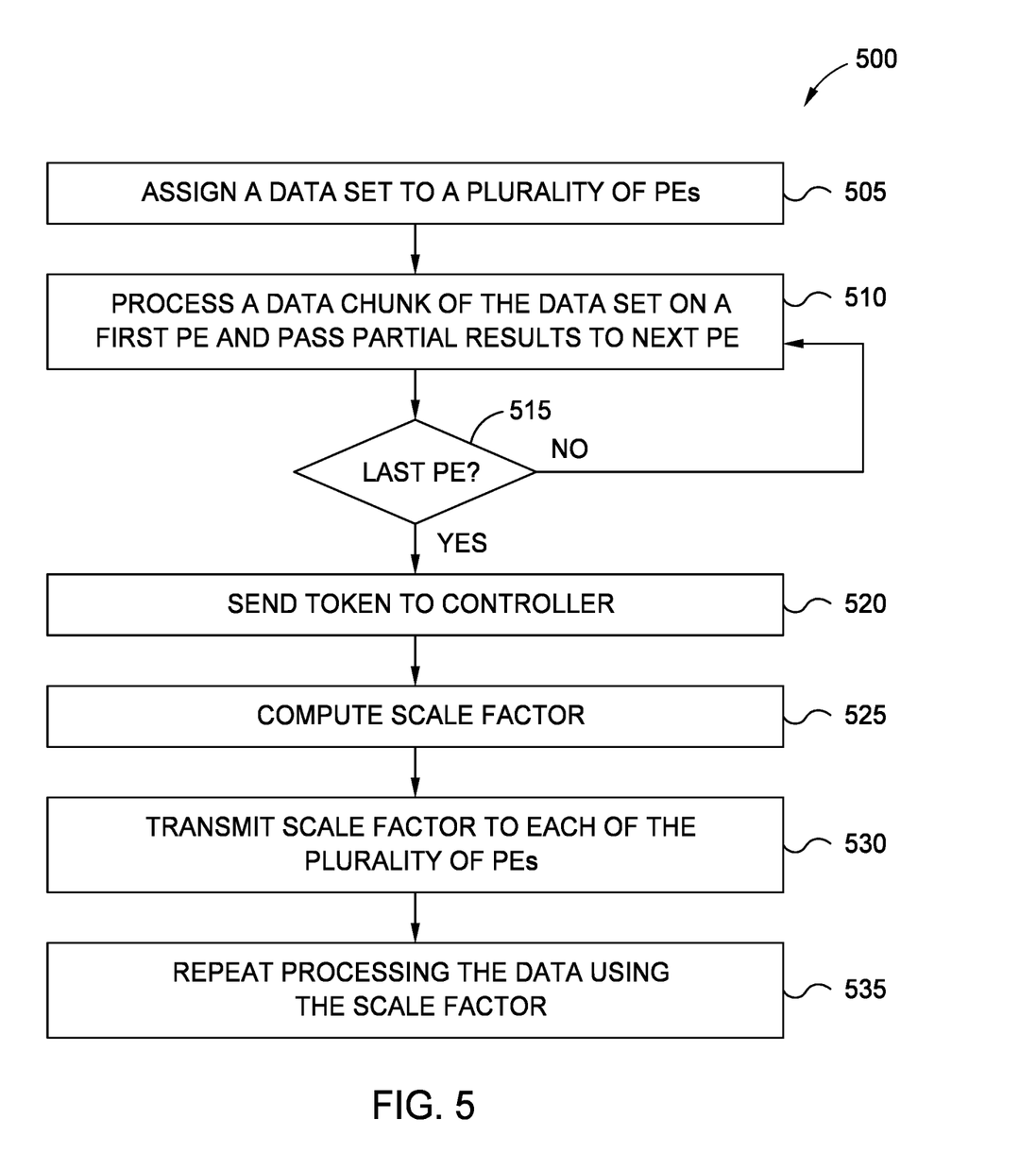
FIG. 5 is a flowchart for parallel processing using a plurality of processing elements and a controller, according to an example.

FIG. 5 is a flowchart of a method 500 for parallel processing using a plurality of processing elements and a controller, according to an example. The method 500 is one example of performing the workflow 400 where the PEs send partial results to each other, which are accumulated, until a final PE sends a token to the controller indicating the plurality of PEs is finished. Thus, in this embodiment, only one token is transmitted to the controller. For clarity, the method 500 is discussed in tandem with FIG. 6 which illustrates dataflow between a plurality of processing elements and a controller, according to one example.

At block 505, the controller assigns a data set to a plurality of PEs. In one embodiment, the data set is processed using an algorithm that has a data dependency such that an operation is performed on the data set as a whole. The data set can be divided into a plurality of data chunks (e.g., data elements) that are assigned to different PEs.

Figure 6:
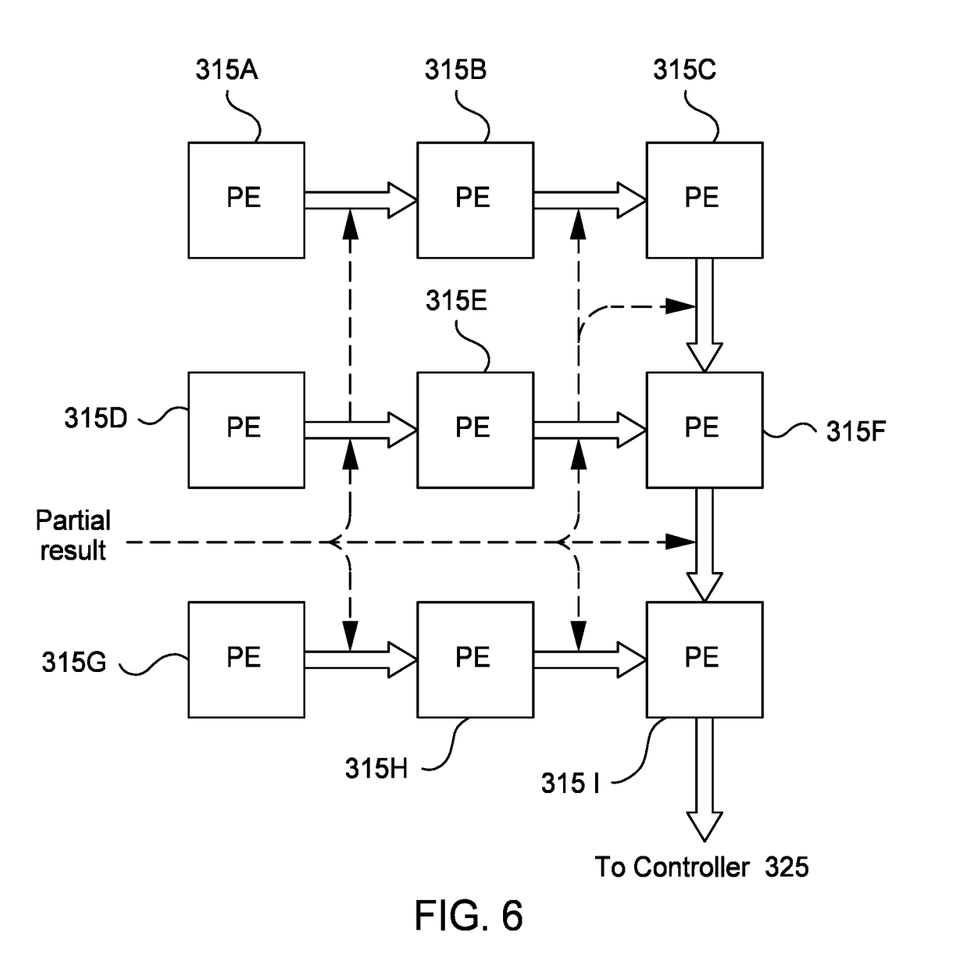
FIG. 6 illustrates dataflow between a plurality of processing elements and a controller, according to an example.

At block 510, a first PE processes a first data chunk of the data set using a first operation and passes partial results to a next PE. As shown in FIG. 6, the PE 315A can process a first data chunk and forward the resulting data to the next PE—i.e., the PE 315B.

At block 515, the process can iterate through the plurality of PEs where they receive the accumulated partial results from previous PEs, calculate their partial result using the assigned data chunk, and forward the accumulated partial results to the next PE. For example, the partial results generated by PE 315A is passed to PE 315B which calculates its own partial results from its respective data chunk, accumulates this data with the partial results received from PE 315A, and transmits the accumulated partial results to PE 315C. PE 315C calculates its partial results, accumulates it with the received partial results, and forwards it to PE 315D.

PE 315F receives accumulated partial results from both PE 315C and 315E (which includes the partial results from PE 315D). The PE 315I receives accumulated partial results from PE 315F and from PE 315H (which includes the partial results from PE 315G). The PE 315I stores the accumulated partial results from each of the PEs 315A-I.

In the case of Softmax, each PE 315 performs exp(x) and then the downstream PEs accumulate the exp(x) of all inputs. For example, assuming the PE 315A is assigned data [1, 2, 3] in a tensor, the PE 315A computes exp(1), exp(2), exp(3); saves it in local memory; computes exp(1)+exp(2)+exp(3)=exp_pe1; and transmits exp_pe1 to PE 315B. Assuming PE 315B receives data [4, 5, 6] of the tensor, PE 315B computes exp(4), exp(5), exp(6); saves it in local memory; computes exp_pe1+exp(4)+exp(5)+exp(5)=exp_pe2; and transmits exp_pe2 to PE 315C. They can continue for all the PEs 315 until PE 315I calculates the accumulated partial results for the PEs 315A-I.

In the case of Layer Norm and Batch Norm, the PEs 315 accumulate all inputs to subsequently calculate the mean.

At block 520, since the PE 315I is the last PE, the PE 315I sends a token to the controller indicated that the plurality of PEs have finished calculating the partial results. Thus, in this embodiment, only one token is sent to the controller.

At block 525, the controller determines a scale factor using the accumulated partial results. For example, the controller can receive the partial result from PE 315I (e.g., exp_pe9) and calculate a scale value (e.g., inverse_square_root(exp_pe9).

At block 530, the controller transmits (e.g., broadcasts) the scale factor to the plurality of PEs (e.g., the PEs 315A-I in FIG. 6).

At block 535, the PEs repeat processing their assigned data chunks, but this time, using the scale factor. For example, in the (second) iteration of a Softmax operation, the PE 315A computes exp(1)/invsqrt(exp_pe3), exp(2)/invsqrt(exp_pe3), exp(3)/invsqrt(exp_pe3) and saves it to local memory. PE 315B computes exp(4)/invsqrt(exp_pe3); exp(5)/invsqrt(exp_pe3), exp(6)/invsqrt(exp_pe3) and saves it to local memory. PE 315C computes exp(7)/invsqrt(exp_pe3); exp(8)/invsqrt(exp_pe3); exp(9)/invsqrt(exp_pe3) and saves it to local memory, and so forth. In this embodiment, the PEs may not pass data to each other in the second iteration. That is, the final result generated by each PE does not get accumulated by the PEs.

However, in other embodiments, the results may be accumulated during the second iteration. For example, the accumulated results may be again transmitted to the controller which generates a different scale factor which is then again broadcasted to the PEs so they can perform a third iteration, and so on.

Assuming the second iteration is the final step in processing the tensor (which is true if the method 500 is used to perform a Softmax or Layer Norm and Batch Norm operation), the PEs can transmit the final results to the global memory as discussed above. In that case, the method 500 can repeat where the PEs are assigning data chunks from another data set (e.g., a tensor).

Figure 7:
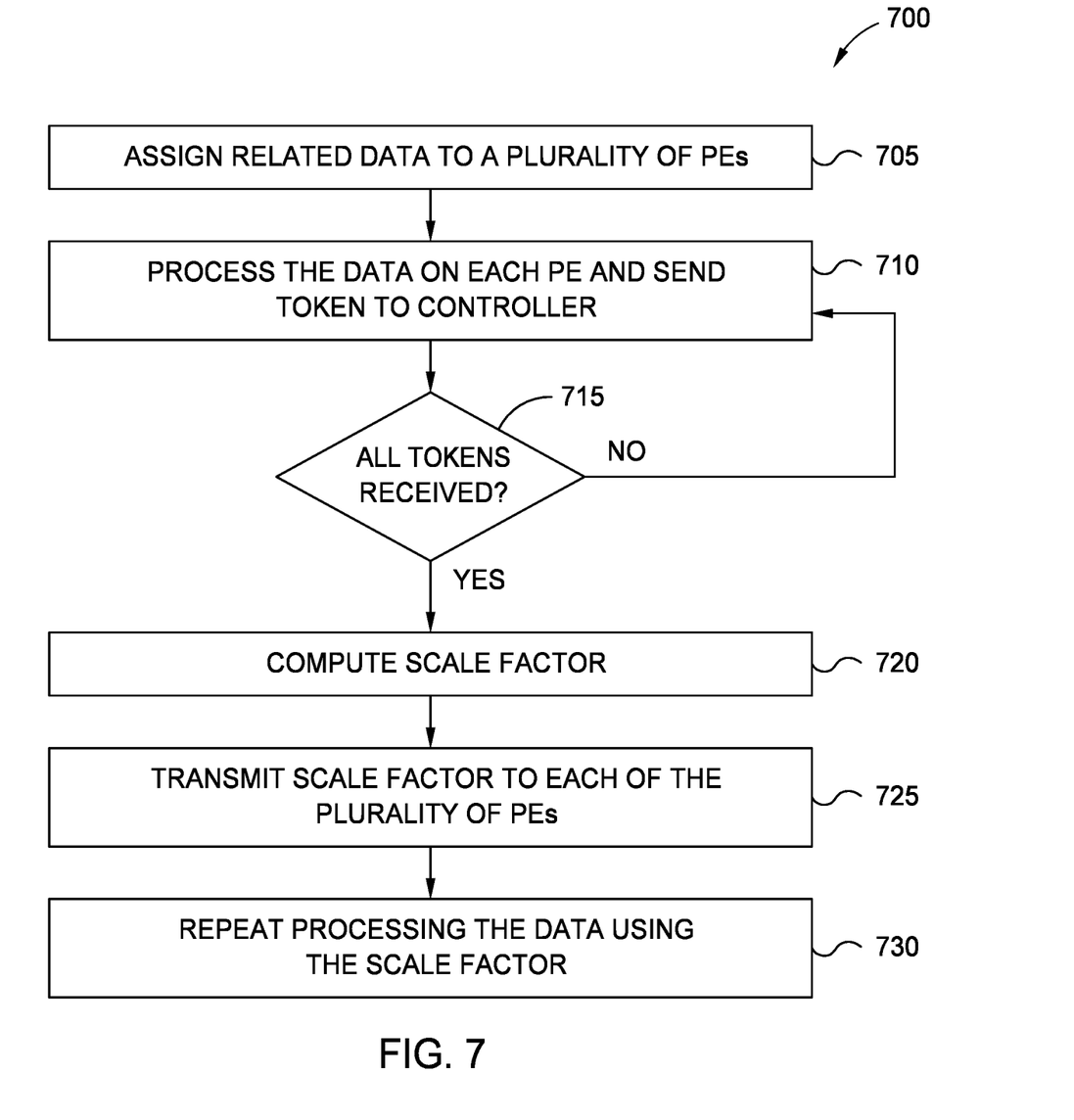
FIG. 7 is a flowchart for parallel processing using a plurality of processing elements and a controller, according to an example.

FIG. 7 is a flowchart of a method 700 for parallel processing using a plurality of processing elements and a controller, according to an example. The method 700 is one example of performing the workflow 400 where the PEs send partial results to the controller along with respective tokens. Thus, in this embodiment, each PE transmits a token to the controller. For clarity, the method 700 is discussed in tandem with FIG. 8 which illustrates dataflow between a plurality of processing elements and a controller, according to one example.

At block 705, the controller assigns a data set to a plurality of PEs. In one embodiment, the data set is processed using an algorithm that has a data dependency such that an operation is performed on the data set as a whole. The data set can be divided into a plurality of data chunks (e.g., data elements) that are assigned to different PEs.

Figure 8:
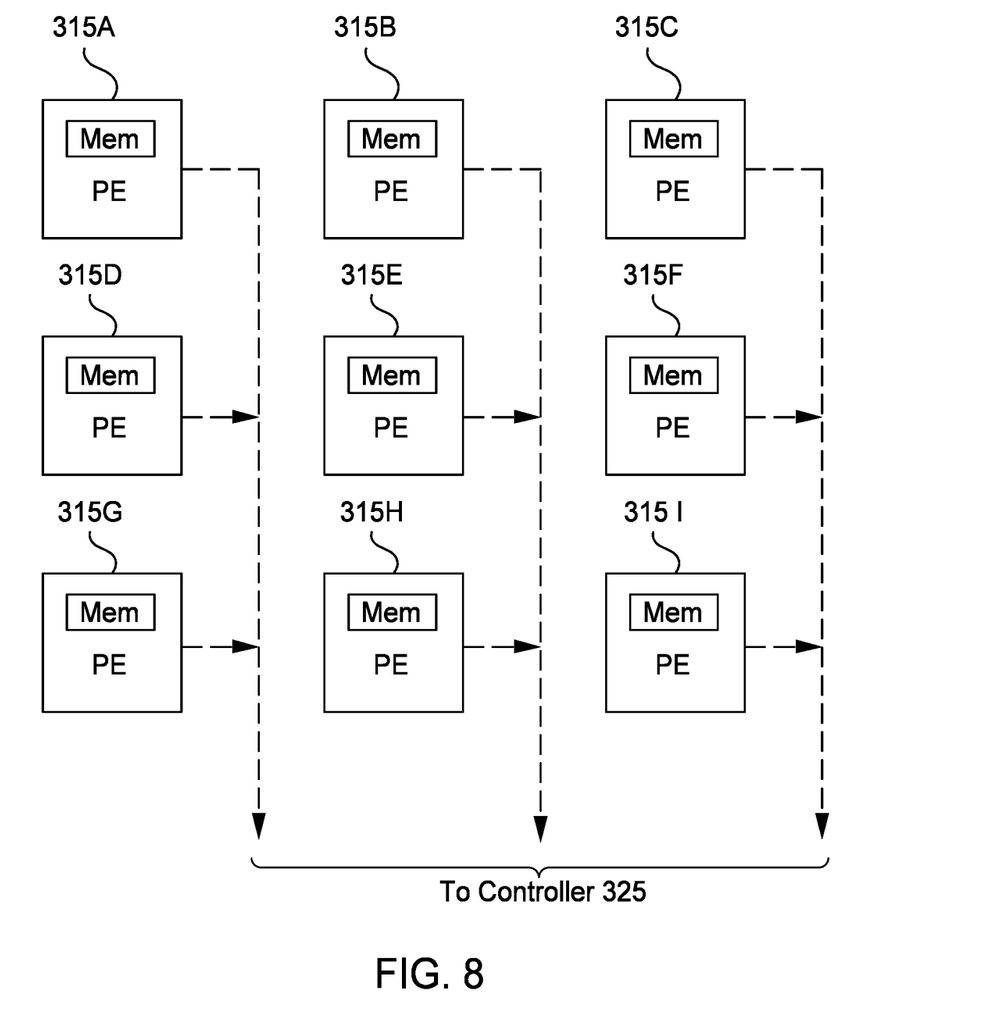
FIG. 8 illustrates dataflow between a plurality of processing elements and a controller, according to an example.

At block 710, the data chunks are processed in the plurality of PEs in parallel. Once finished with processing their respective data chunks, the PEs each transmit a token to the controller. For example, assume PE 315A in FIG. 8 is assigned data [1, 2, 3], PE 315B in FIG. 8 is assigned data [4, 5, 6] and PE 315C in FIG. 8 is assigned [7, 8, 9].

In one embodiment, PE 315A computes exp(1), exp(2), exp(3), saves it in local memory, computes exp(1)+exp(2)+exp(3)=exp_pe1 and saves it in local memory. The PE 315A sends a completion token to the controller.

PE 315B computes exp(4), exp(5), exp(6), saves it in local memory, computes exp(4)+exp(5)+exp(5)=exp_pe2 and saves it in local memory. PE 315B sends a completion token to the controller.

PE 315C computes exp(7), exp(8), exp(9), saves it in local memory, computes exp(7)+exp(8)+exp(9)=exp_pe3, and saves it in local memory. PE 315C then sends a completion token to the controller.

At block 715, the controller waits until receiving a token from each of the plurality of PEs. The controller can perform other tasks while it waits for each of the PEs to transmit a token.

Once the tokens are received, the method 700 proceeds to block 720 where the controller computes the scale factor using the partial results generated by each of the plurality of PEs. For example, the controller can receive the partial results from PE 315A-I (e.g., exp_pe1, exp_pe2, . . . , exp_pe9) and calculate a scale value (e.g., inverse_square_root of the accumulated partial results received from the PEs 315A-I). That is, the controller can read exp_pe1, exp_p2, exp_pe3, . . . exp_pe9 from the PEs 315A-I; compute a summation exp_pe=exp_pe1+exp_pe2+exp_pe3+ . . . +exp_pe9; then compute inverse_square_root (exp_pe).

At block 725, the controller transmits (e.g., distributes or broadcasts) the scale factor to the plurality of PEs (e.g., the PEs 315A-I in FIG. 8).

At block 730, the PEs repeat processing their assigned data chunks, but this time, using the scale factor. For example, in this (second) iteration, PE 315A computes exp(1)/invsqrt(exp_pe), exp(2)/invsqrt(exp_pe); exp(3)/invsqrt(exp_pe), and saves it to local memory. PE 315B computes exp(4)/invsqrt(exp_pe), exp(5)/invsqrt(exp_pe), exp(6)/invsqrt(exp_pe), and saves it to local memory. PE 315C computes exp(7)/invsqrt(exp_pe), exp(8)/invsqrt(exp_pe), exp(9)/invsqrt(exp_pe), and saves it to local memory, and so forth.

However, in other embodiments, blocks 710-725 can be repeated again so the PEs process the data during a third iteration. For example, the results from performing the second iteration (and respective tokens) can again be transmitted to the controller where it determines another scale factor which is then broadcasted to the PEs so they can perform a third iteration, and so on.

Assuming the second iteration is the final step in processing the tensor (which is true if the method 700 is used to perform a Softmax or Layer Norm and Batch Norm operation), the PEs can transmit the final results to the global memory as discussed above. In that case, the method 700 can repeat where the PEs are assigning data chunks from another data set (e.g., a tensor).

Some non-limiting advantages of the embodiments above include:

Reconfigurable accelerator methodology to compute SoftMax, Layer Norm and Batch Norm using same hardware resources for training and inference.

Scalable accelerator topology to compute SoftMax, Layer Norm and Batch Norm to implement it across different heterogeneous architectures like the SoC 100 in FIG. 1.

The methods discuss above are applicable to ML training and inference alike.

Each PE communicates its execution completeness by generating an interrupt/token. Thus, the controller does not have to poll many PEs in the array to accumulate partial computations from different kernels.

The controller can leverage hardware resources either on FPGA fabric or DPE tile to compare completeness of each PE based on a known metric, such as type and number of tokens received. This eliminates software overhead to comparison of completeness.

The controller can read partial result from each PE independently (method 700), or, from a single end-point PE in the PE array (method 500), that accumulates all partial results from independent PEs by leveraging dataflow topology.

In PL fabric, quantize/dequantize layers can be added prior to and after non-linear activation using PL/DPE compute resources, eliminating the use of software quantize/dequantize layers. In one embodiment, a quantize layer converts a floating-point number to integer (with or without scaling and zero-point correction). A dequantize layer converts an integer to floating point (with or without scaling and zero-point correction).

Int8/16/32, FP32, bfloat16, BFP12/13/16 and mixed precision modes can be used at various stages of compute in the PEs. Having a configurable accumulator precision provides a means to achieve increased throughput if relatively higher error can be tolerated during inference.

Implementation of exponential and non-linear functions within PEs can be done leveraging these embodiments discuss above. This allows for a fast, efficient method on FPGAs and SoCs.

Apriori knowledge of size of tensors gives architects flexibility to scale the PE array as needed at the compile time. For example, if the maximum size of tensor is 1000 elements, only 1 PE can be used if latency is lower than required. However, if a lower latency is needed, the same workload can be distributed across 8 PEs.

In devices with no fabric, the controller can be an existing DPE tile. In such case, scalar/vector processor of controller tile may not contain functions to perform inverse and/or inverse square root. In such cases, Newton Raphson methods can be implemented to compute inverse and inverse square root. Thus, this method is versatile and can be implemented on FPGA as well as ASIC DPE arrays.

Features enabled by the embodiments include:
Method and apparatus to compute softmax, layer norm and batch norm non-linear compute kernels for training as well as inference on DPEs (such as AI Engines) and Programmable Logic;
Methods to implement scalable Softmax, Layer Norm and Batch Norm using many parallel PEs in a PE array;
Methods to schedule compute for the before mentioned operators on variable number of PEs from large pool of PE array;
A mixed precision mode within PEs that can be configured appropriate to the application throughput and accuracy trade-off requirement;
A specific handshake protocol between controller and PEs to specifically to solve re-entrant compute pattern found in Softmax and layer normalization non-linear kernels;
Methods to design reentrant kernels in a PE array using an instruction-based controller.
Methods to interrupt PE array at a particular breakpoint, reconfigure its contents (scale values as shown in FIG. 4) and continue in place compute, avoiding moving the data in and out of the PEs which saves a time and results in high throughput;
Methods to use variable number of controllers and PEs depending on the tensor topology. For example, a tensor (M, N) with M>>N, where the mean is computed over N, could use a larger number of controllers with relatively less PEs per controller. On the other hand, a tensor (M, N) with N>>M could use a relatively lesser number of controllers with many PEs per controller. This is limited by the total number of PEs and controllers available on a device, but the methodology can be implemented on any heterogeneous processing system like the SoC 100 in FIG. 1.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC), comprising:
a plurality of processing elements (PEs) comprising circuitry, each of the plurality of PEs comprising a local memory for storing data chunks of a data set, wherein the plurality of PEs is configured to perform an operation that has a data dependency among the data chunks; and
a controller comprising circuitry, the controller configured to:
receive at least one token from the plurality of PEs indicating they have finished a first iteration of processing the data chunks in parallel;
receive partial results generated by the plurality of PEs based on performing the first iteration;
determine intermediate results from the partial results to resolve the data dependency; and
distribute the intermediate results to the plurality of PEs;
wherein the plurality of PEs is configured to perform a second iteration to process the data chunks in parallel based on the intermediate results.

2. The IC of claim 1, wherein, during the first iteration, the plurality of PEs is configured to transmit their respective partial results to a downstream PE so that the partial results are accumulated in a single PE of the plurality of PEs,
wherein the single PE is configured to transmit the at least one token and the accumulated partial results to the controller.

3. The IC of claim 2, wherein only the single PE of the plurality of PEs transmits partial results and tokens to the controller.

4. The IC of claim 1, wherein, during the first iteration, the plurality of PEs each transmit a token to the controller and each transmit their respective partial results to the controller.

5. The IC of claim 1, further comprising:
a global memory coupled to the plurality of PEs and to store the data set, wherein the plurality of PEs receive the data chunks from the global memory using a direct memory access (DMA), wherein each of the plurality of PEs, after completing the second iteration, is configured to transmit final results to the global memory.

6. The IC of claim 1, wherein the IC includes an array of data processing engines (DPEs), wherein each of the plurality of PEs includes one or more of the DPEs.

7. The IC of claim 6, wherein each of the DPEs includes a core and memory.

8. The IC of claim 6, wherein at least one of the plurality of PEs is implemented using multiple DPEs.

9. The IC of claim 6, wherein the IC comprises a heterogeneous processing system which includes different types of processing elements, one of which includes the DPEs.

10. An IC, comprising:
a plurality of PEs comprising circuitry, each of the plurality of PEs comprising a local memory for storing a respective data chunk of a data set, wherein the plurality of PEs is configured to perform an algorithm on the data chunks that includes an operation which requires each of the data chunks;

a controller comprising circuitry, the controller configured to:
receive at least one token from the plurality of PEs indicating they have finished a first iteration of processing the data chunks in parallel;
receive partial results generated by the plurality of PEs based on performing the first iteration;
determine intermediate results by performing the operation based on the partial results; and
distribute the intermediate results to the plurality of PEs;

wherein the plurality of PEs is configured to perform a second iteration to process the data chunks in parallel based on the intermediate results.

11. The IC of claim 10, wherein, during the first iteration, the plurality of PEs is configured to transmit their respective partial results to a downstream PE so that the partial results are accumulated in a single PE of the plurality of PEs,
wherein the single PE is configured to transmit the at least one token and the accumulated partial results to the controller.

12. The IC of claim 11, wherein only the single PE of the plurality of PEs transmits partial results and tokens to the controller.

13. The IC of claim 10, wherein, during the first iteration, the plurality of PEs each transmit a token to the controller and each transmit their respective partial results to the controller.

14. The IC of claim 10, further comprising:
a global memory coupled to the plurality of PEs and to store the data set, wherein the plurality of PEs receive the data chunks from the global memory using a direct memory access (DMA), wherein each of the plurality of PEs, after completing the second iteration, is configured to transmit final results to the global memory.

15. The IC of claim 10, wherein the IC includes an array of DPEs, wherein each of the plurality of PEs includes one or more of the DPEs.

16. The IC of claim 15, wherein each of the DPEs includes a core and memory, wherein at least one of the plurality of PEs is implemented using multiple DPEs.

17. The IC of claim 15, wherein the IC comprises a heterogeneous processing system which includes different types of processing elements, one of which includes the DPEs.

18. A method, comprising:
processing, during a first iteration and in parallel, data chunks of a data set at respective ones of a plurality of PEs, wherein the first iteration is part of an operation that has a data dependency among the data chunks;
transmitting, from at least one PE of the plurality of PEs, a token to a controller indicating the plurality of PEs have finished the first iteration;
receiving, at the controller, partial results generated by the plurality of PEs based on performing the first iteration;
determining intermediate results from the partial results to resolve the data dependency;
distributing the intermediate results to the plurality of PEs; and
processing, during a second iteration and in parallel, the data chunks and the intermediate results at the plurality of PEs.

19. The method of claim 18, wherein, during the first iteration, the plurality of PEs transmit their respective partial results to a downstream PE so that the partial results are accumulated in a single PE of the plurality of PEs,
wherein the single PE transmits the token and the accumulated partial results to the controller.

20. The method of claim 19, wherein the plurality of PEs each transmit a token to the controller after completing the first iteration and each transmit their respective partial results to the controller.

* * * * *